United States Patent
Gautier

[19]

[11] Patent Number: 6,135,246
[45] Date of Patent: Oct. 24, 2000

[54] DISK BRAKE WITH BALANCED REACTION

[75] Inventor: Jean-Pierre Gautier, Aulnay-SS-Bois, France

[73] Assignee: Bosch Systemes de Freinage, Drancy, France

[21] Appl. No.: 09/254,062

[22] PCT Filed: Feb. 8, 1999

[86] PCT No.: PCT/FR99/00285

§ 371 Date: Feb. 26, 1999

§ 102(e) Date: Feb. 26, 1999

[87] PCT Pub. No.: WO99/41518

PCT Pub. Date: Aug. 19, 1999

[30] Foreign Application Priority Data

Feb. 12, 1998 [FR] France ................................ 98 01663

[51] Int. Cl.[7] .................................................. F16D 65/14
[52] U.S. Cl. ................. 188/73.45; 188/71.1; 188/73.37; 188/73.39
[58] Field of Search ................................ 188/370, 73.31, 188/73.39, 73.43, 73.44, 73.45, 73.42, 73.46, 71.1, 73.47, 73.37, 73.35, 73.36, 73.41

[56] References Cited

U.S. PATENT DOCUMENTS

| | | | |
|---|---|---|---|
| 4,219,106 | 8/1980 | Lupertz et al. ....................... | 188/73.39 |
| 4,410,070 | 10/1983 | Hagiwara et al. .................... | 188/73.31 |
| 4,775,034 | 10/1988 | Pachner et al. ....................... | 188/73.45 |
| 5,036,932 | 8/1991 | Schonenberger ....................... | 188/71.1 |
| 5,111,914 | 5/1992 | Thiel et al. ............................ | 188/73.34 |
| 5,234,080 | 8/1993 | Pantale ................................ | 188/73.31 |
| 5,411,120 | 5/1995 | Null ..................................... | 188/73.42 |
| 5,551,537 | 9/1996 | Mery et al. ............................ | 188/73.39 |
| 5,588,508 | 12/1996 | Le Deit ................................ | 188/73.31 |
| 6,047,795 | 4/2000 | Kobayashi et al. ................... | 188/73.45 |

FOREIGN PATENT DOCUMENTS 94 24452 10/1994 WIPO.

*Primary Examiner*—Matthew C. Graham
*Assistant Examiner*—Thomas J. Williams
*Attorney, Agent, or Firm*—Leo H McCormick, Jr.; Warren Comstock

[57] ABSTRACT

A disc brake for a motor vehicle including a disc (1), a carrier fixed to the vehicle and inboard (51) and outboard (52) pads. The respective ends (511,512,521,522) of the inboard (51) and outboard (52) pads slide in an upstream branch (21) and a downstream branch (22) of housings (211,221,212,222) of the carrier. Each of the upstream and downstream branches (21,22) of the carrier provides a stop (611,622) to one of the inboard and outboard pads (51,52) however, each of the pads (51,52) only comes into abutment against one of the upstream and downstream branches. The upstream and downstream branches (21,22) being connected to a base (23) different cross-sections and correspondingly different stiffness in a ratio of between 0.80 to 1.25 to resist forces applied to the stop (611,622) without appreciable degradation in the operational performance of the disc brake.

8 Claims, 4 Drawing Sheets

DISK BRAKE WITH BALANCED REACTION

The present invention relates to a disc brake for a motor vehicle.

More specifically, the present invention relates to a disc brake of the type which comprise: a disc which has an inboard face and an outboard face, this disc rotating about a transverse axis in a direct sense of rotation when the vehicle is travelling forward; a carrier comprising an upstream branch and a downstream branch straddling the disc and secured to a common base which is fixed to the vehicle facing the inboard face of the disc, the downstream branch following on from the upstream branch in the direct sense of rotation of the disc, and each branch having an inboard housing and an outboard housing which are situated one on each side of the disc; a caliper straddling the disc and mounted so that it can slide relative to the carrier in a transverse direction parallel to the transverse axis, this caliper comprising a jaw pointing towards the outboard face of the disc, and a cylinder closed by a piston and pointing towards the inboard face of the disc; first and second guide means provided respectively on the carrier and on the caliper, one of the guide means consisting of a first bore, and the other consisting of a first pin sliding in the first bore; and a pair of friction pads, this pair being formed of an inboard pad and of an outboard pad placed respectively, in the transverse direction, between the piston and the inboard face of the disc, and between the outboard face of the disc and the jaw of the caliper, the inboard pad having an upstream end and a downstream end which are mounted so that they can slide in the respective inboard housings of the upstream and downstream branches, and the outboard pad having an upstream end and a downstream end which are mounted so that they can slide in the respective outboard housings of the upstream and downstream branches, the inboard and outboard pads bearing, between their respective ends, respective friction linings pointing towards the inboard and outboard faces of the disc and by means of which each pad is urged by the disc in the direct sense of rotation in the event of braking while the vehicle is travelling forwards, a first and a second at least of the inboard and outboard housings of the upstream and downstream branches forming stops for the respective ends of the pads, these stops being capable of opposing a movement of the inboard and outboard pads in the direct sense of rotation.

Disc brakes of this type are well known in the prior art, as shown, for example, in Patent Documents PCT/FR96/00615, PCT/FR94/00174, and EP-0,694,133.

One of the many problems which arise when designing disc brakes lies in the difficulty of absorbing the dragging forces transmitted to the pads by the disc, without the carrier deformations which necessarily result from this causing resistance that opposes the satisfactory sliding of the caliper relative to the carrier, as such a resistance itself generates abnormal wear and unevenness of the pads, risks of brake seizure, increase in brake-fluid absorption, noise, etc.

SUMMARY OF THE INVENTION

The invention falls within this context and its purpose is to propose a disc brake capable of deforming without appreciable functional anomaly.

To this end, the brake of the invention which in other respects conforms to the above preamble, is essentially characterized in that when the pads are urged in the direct sense of rotation, just a first of the inboard and outboard housings of the upstream branch forms an upstream stop for the upstream end of just a first one of the inboard and outboard pads, while just a second one of the inboard and outboard housings of the downstream branch forms a downstream stop for the downstream end of just a second one of the inboard and outboard pads, in that the upstream branch has a first stiffness for a force applied to the upstream stop, in that the downstream branch has a second stiffness for a force applied to the downstream stop, and in that the ratio between the first and second stiffnesses is between 0.80 and 1.25.

In other words, the disc brake of the invention is such that each of the upstream and downstream branches offers a stop to one of the inboard and outboard pads, that each of the pads abuts against just one of the branches, and that the upstream and downstream branches have stiffnesses which are at least similar, the ratio between these stiffnesses moreover preferably being between 0.95 and 1.05.

In one possible embodiment of the invention, the first housing is the inboard housing of the upstream branch whereas the second housing is the outboard housing of the downstream branch, and the upstream end of the inboard pad has a retaining profile via which this upstream end is caught onto the upstream stop of the inboard housing of the upstream branch, the downstream end of the outboard pad for its part bearing against the downstream stop of the outboard housing of the downstream branch.

Bearing in mind the geometry generally adopted for the carrier, and according to which the upstream and downstream branches are connected to the base of the carrier by respective upstream and downstream bridges, it may be advantageous according to the invention to make provision for the bridge, which connects to the base of the carrier that branch one of whose housings forms a stop for the inboard pad, to have a cross-section which is smaller than the cross-section of the bridge which connects to the base of the carrier that branch one of whose housings forms a stop for the outboard pad.

If the lower end of the upstream bridge is defined as being that end adjoining the base of the carrier and if the upper end of the upstream bridge is defined as being that end which is distant from the base, it is also advantageous to contrive for the first guide means to be located at the upper end of the upstream bridge.

As a preference, the first pin enters the first bore via an opening in the first bore which is in a half-space, delimited by the disc, in which the upstream stop is situated.

The disc brake of the invention may also comprise a third and a fourth guide means provided respectively on the carrier and on the caliper and one of which is a second bore and the other of which is a second pin sliding in the second bore, the second pin entering the second bore via an opening of the second bore which is in the same half-space as the downstream stop.

Finally, it may also be useful to contrive for the upstream and downstream branches only to be connected together by the base of the carrier.

Other features and advantages of the invention will emerge clearly from the description thereof given hereafter by way of non-limiting indication with reference to the appended drawings.

DETAILED DESCRIPTION OF THE INVENTION

Figure 1:
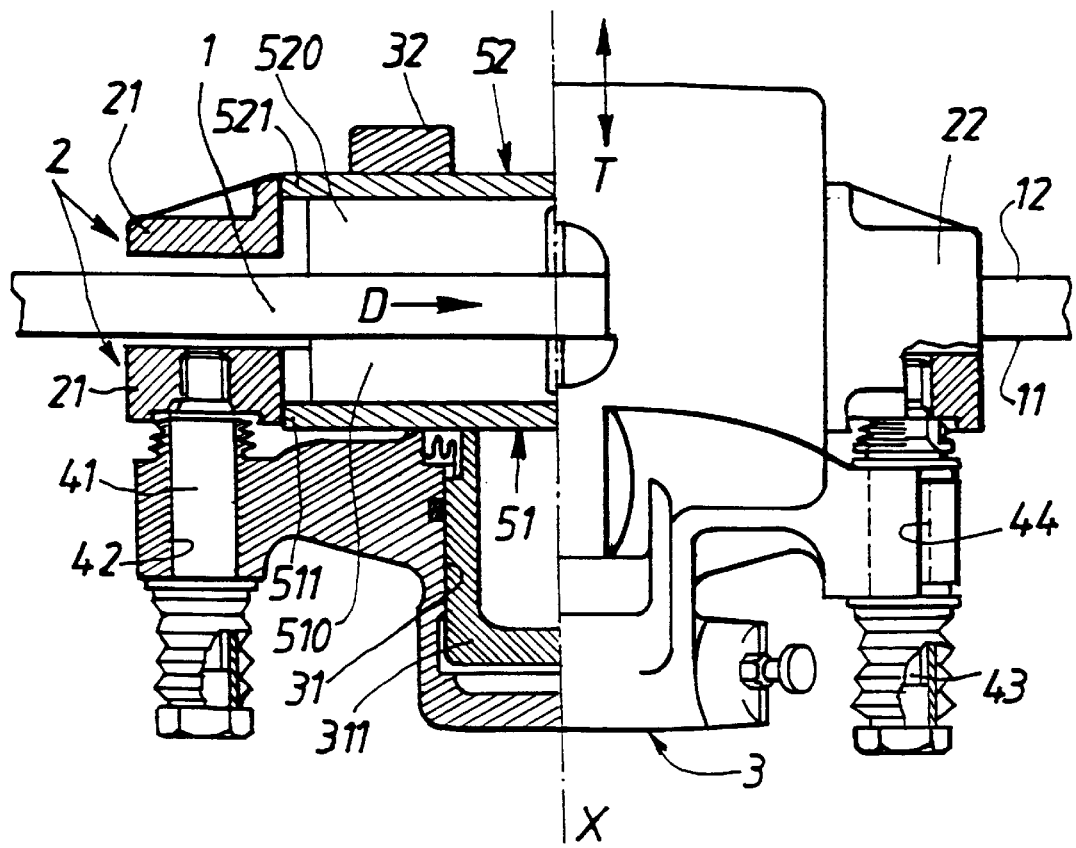
FIG. 1 is a view from above and partially in section of a disc brake of the type to which the present invention is applicable.

As FIG. 1 shows, the invention relates to a disc brake for a motor vehicle, of the type which comprise, in a known way, a disc 1, a carrier 2, a caliper 3, guide means 41, 42, 43, 44 provided on the carrier 2 and on the caliper 3, and a pair of friction pads formed of an inboard pad 51 and of an outboard pad 52.

The disc 1 has an inboard face 11 and an outboard face 12 and is driven, with a wheel of the vehicle, in rotation about a transverse axis X in a direct sense of rotation D when the vehicle is travelling forward.

The carrier 2 comprises an upstream branch 21 and a downstream branch 22 both of which straddle the disc 1 and are secured to a common base 23 of the carrier, the latter being fixed to the vehicle facing the inboard face 11 of the disc, for example using screws inserted in orifices 231 and 232.

By convention, the downstream branch 22 is here defined as being the one which follows on from the other, known as the "upstream branch 21", in the direct sense of rotation D of the disc.

Figure 5:
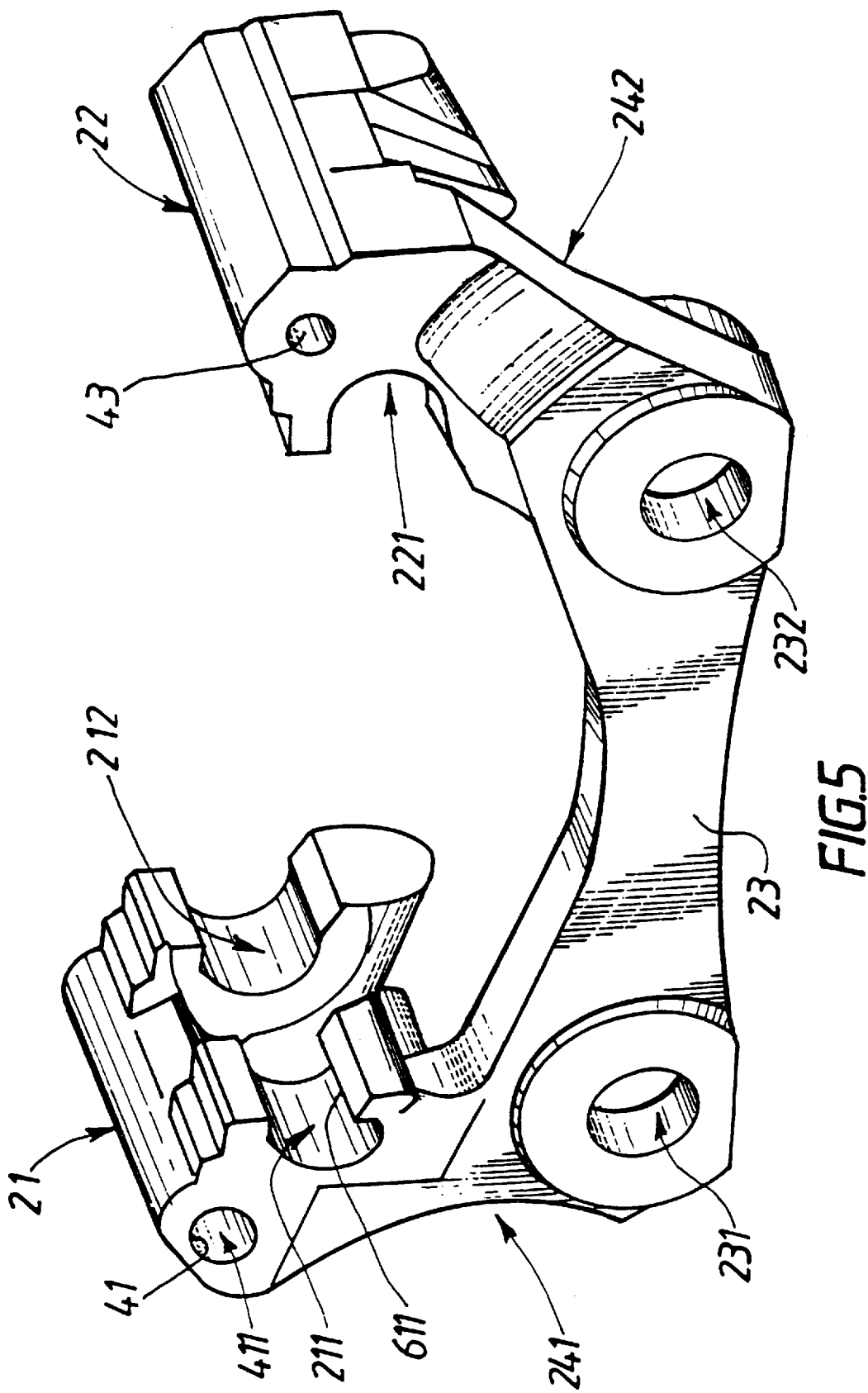
FIG. 5 is a perspective view of a carrier of a disc brake in accordance with the invention, seen from the vehicle on which this brake is mounted.
Figure 6:
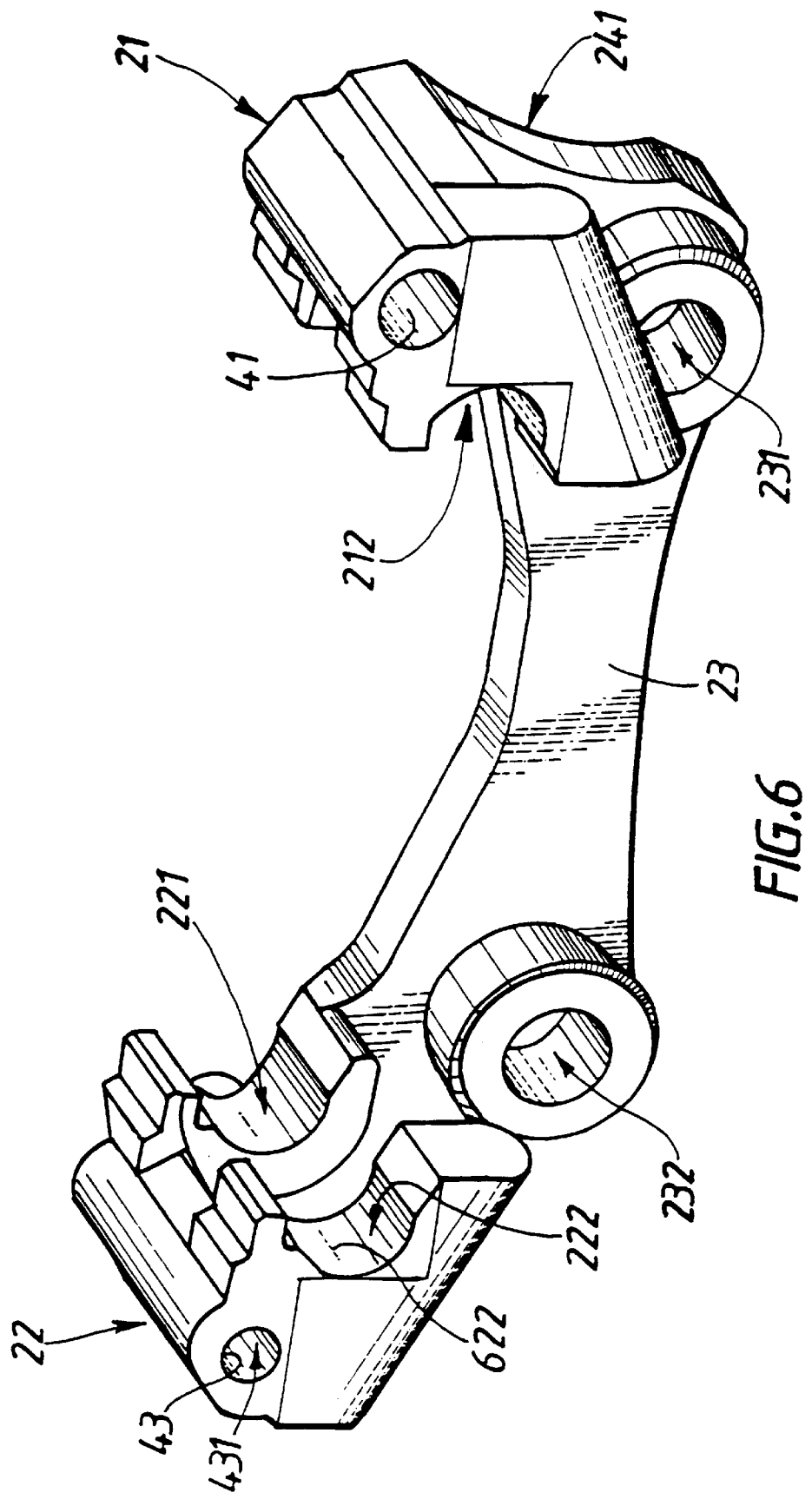
FIG. 6 is a perspective view of a carrier of a disc brake in accordance with the invention, seen from outside the vehicle on which this brake is mounted.

Furthermore, as better shown by FIGS. 5 and 6, each branch has an inboard housing 211, 221 and an outboard housing 212, 222 which housings lie on each side of the disc 1.

The caliper 3 which also straddles the disc 1 is mounted so that it can slide relative to the carrier 2, in a transverse direction T parallel to the transverse axis X.

This caliper 3, which acts like a gripper, essentially comprises a jaw 32 pointing towards the outboard face 12 of the disc, and a cylinder 31 situated on the inboard face 11 side of the disc and closed by a piston 311.

The guide means 41, 42, 43 and 44 are made up of pairs, each pair comprising a bore and a pin mounted so that it can slide in this bore.

As FIG. 1 shows, the guide means 41 and 43 provided on the carrier may consist of pins, the guide means 42 and 44 provided on the caliper 3 then consisting of bores.

However, it is also possible to contrive for the guide means 41 and 43 provided on the carrier to consist of bores, as shown in FIGS. 5 and 6, the caliper then being equipped with pins, or alternatively to contrive for the carrier and the caliper each to have one bore and one pin.

However, the layout of these guide means relative to the housings 211, 221, 212, 222 may, according to the invention, be optimized in a way which will be described later.

The inboard pad 51 is placed, in the transverse direction T, between the piston 311 and the inboard face 11 of the disc, and has an upstream end 511 and a downstream end 512 which are mounted so that they can slide in respective inboard housings 211, 221 of the upstream and downstream branches 21, 22.

Similarly, the outboard pad 52 is placed between the outboard face 12 of the disc and the jaw 32 of the caliper, and has an upstream end 521 and a downstream end 522 which are mounted so that they can slide in the respective outboard housings 212, 222 of the upstream and downstream branches 21, 22.

Furthermore, the inboard and outboard pads 51, 52 bear, between their respective ends, friction linings 510, 520, the lining 510 of the inboard pad pointing towards the inboard face 11 of the disc 1, and the lining 520 of the outboard pad pointing towards the outboard face 12 of the disc.

When pressurized brake fluid is injected into the cylinder 31 and pushes the piston 311 towards the disc 1, this piston presses the pad 51 against the inboard face 11 of the disc, the result of this being that the cylinder 31 is forced away from the disc until the jaw 32 presses the outboard pad 52 against the outboard face 12 of the disc with an equivalent force.

If, during this operation, the vehicle is travelling forwards, the pads 51 and 52 are therefore urged, by the disc, and via their linings 510 and 520 which rub against the latter, in the direct sense of rotation D.

Figure 2:
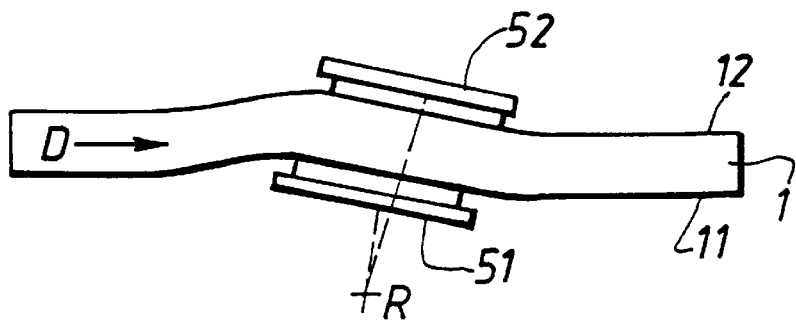
FIG. 2 is a diagrammatic view from above illustrating the behaviour of the pads and of the disc in a disc brake of the prior art.

A defect which is commonplace in known disc brakes is that of leading, at least when this urging is relatively strong, to a deformation of the disc, as illustrated, intentionally exaggerated, in FIG. 2.

What happens is that as the forces received from the disc by the pads have ultimately to be transmitted to the vehicle chassis via the carrier, and as the latter is fixed to the vehicle only on the inboard pad 51 side, the natural tendency of the carrier and of the caliper is to pivot about an imaginary axis of rotation R on the same side as the vehicle.

This movement, which is accompanied by a greater movement of the outboard pad 52 than of the inboard pad 51 in the direct sense D causes elastic warping of the disc, which has a tendency to worsen by positive retroaction of the phenomenon and to deform the brake in such a way that the sliding of the caliper relative to the carrier thereby becomes degraded.

Be that as it may, as the carrier's special purpose is to hold the pads relative to the disc, and therefore in this case to offer elastic resistance to the movement of the pads in the direct sense of rotation D, each pad then necessarily bears against the carrier, either because its upstream end is retained by the corresponding housing of the upstream branch 21, or because its downstream end is retained by the corresponding housing of the downstream branch 22, or again because each of its ends is retained by the corresponding housing of the corresponding branch, as recommended, for example, in the Patent Document EP-0,694,133 cited in the preamble.

The disc brake of the invention can be distinguished from the prior art especially in the fact that for an urging of the pads in the direct sense of rotation D, just a first one of the inboard and outboard housings 211, 212 of the upstream branch 21 forms an upstream stop 611 for the upstream end of just a first of the inboard and outboard pads 51, 52, whereas just a second one of the inboard and outboard housings 221, 222 of the downstream branch 22 forms a downstream stop 622 for the downstream end of just a second one of the inboard and outboard pads 51, 52.

In other words, each of the upstream and downstream branches 21, 22 offers a stop to one of the inboard and outboard pads 51, 52, and each of these pads bears only against one of these branches.

Figure 4:
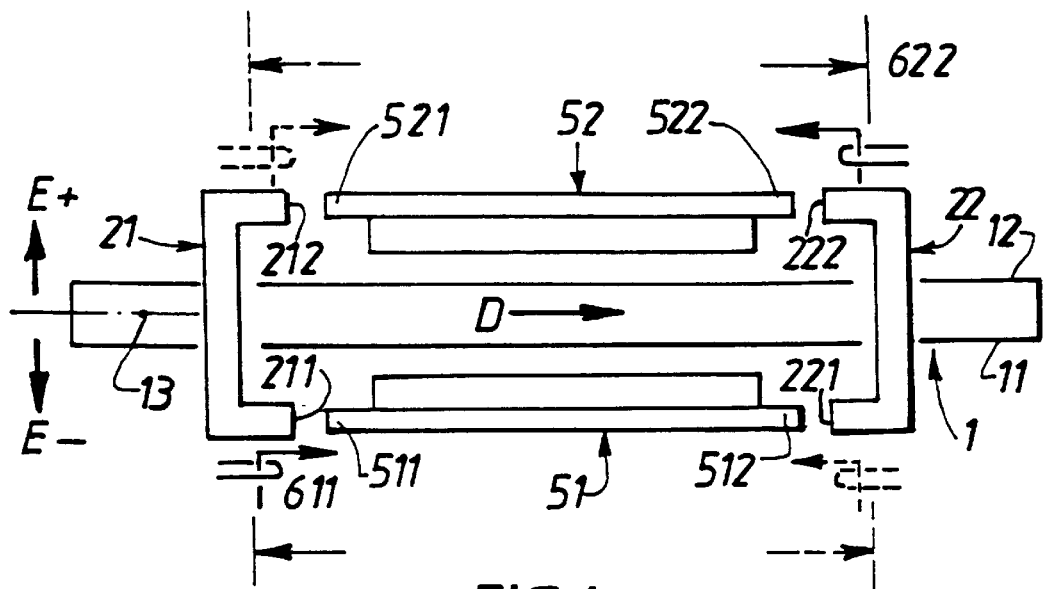
FIG. 4 is a diagrammatic view from above of a disc brake in accordance with the invention.

These features are illustrated symbolically in FIG. 4, which contains two types of pictorial symbol, namely a pictorial symbol $P_{traction}$ formed of an arrow pulling a bolt engaged in a hook, this pictorial symbol being, for example, the one associated with the upstream stop 611, and a pictorial symbol $P_{thrust}$ formed of an arrow pressing against a wall, this pictorial symbol being, for example, the one associated with the downstream stop 622.

Figure 3:
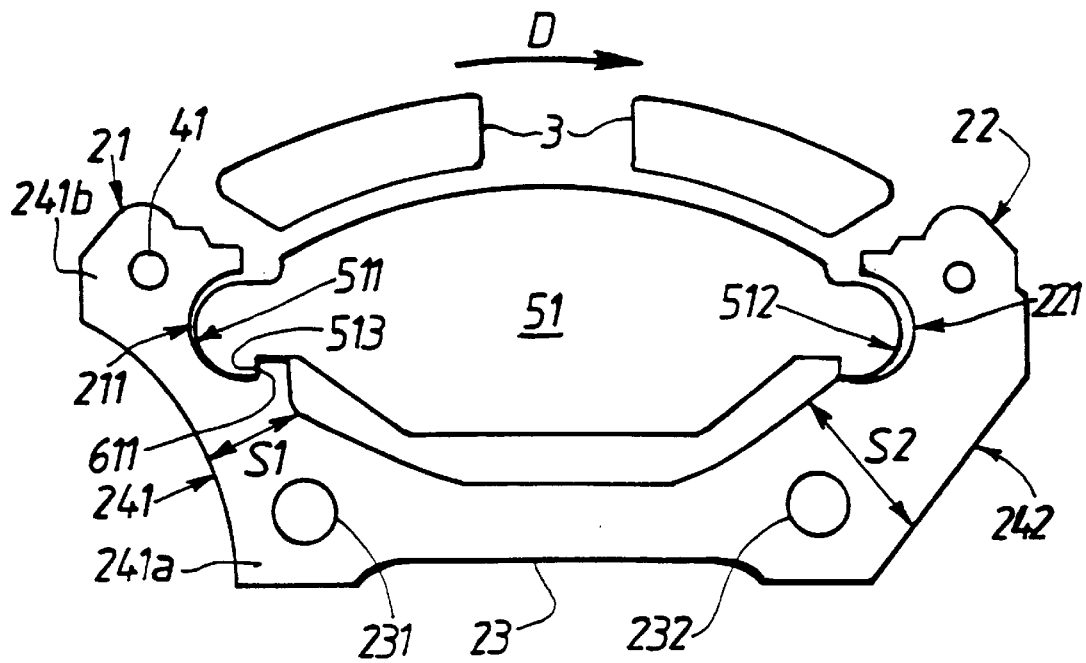
FIG. 3 is a diagrammatic front-on view of a disc brake in accordance with the invention, seen from the vehicle on which it is mounted.

The pictorial symbol $P_{traction}$ symbolizes the method of transmission of force by catching as illustrated by FIG. 3 in the case of the upstream end 511 of the inboard pad 51, the latter having a retaining profile 513 via which this upstream end 511 is caught on the upstream stop 611 of the inboard housing 211 of the upstream branch 21.

The pictorial symbol $P_{thrust}$ for its part symbolizes a method of transmitting a force by pressing, more specifically the means which in this case applies to the downstream end 522 of the outboard pad 52, which presses against the downstream stop 622 of the outboard housing 222 of the downstream branch 22 when this outboard pad is dragged by the disc 1 in the direct sense of rotation D.

The pictorial symbols $P_{traction}$ and $P_{thrust}$ visible in FIG. 4 can be distinguished from one another in a further way by additional graphics, namely the sense of their arrow, and the nature of the line (solid line or broken line) depicting them, these graphics having the sole purpose of allowing a complete understanding of the invention.

Bearing all of these conventions in mind, one of the major aspects of the invention is that the methods of transmission of force depicted by pictorial symbols in solid line are incompatible with the methods of transmission of force depicted by pictorial symbols in broken line, that is to say they must not be used in the same brake, pictorial symbols shown in solid line, however, being mutually compatible, as are pictorial symbols shown in broken line.

Furthermore, if we restrict ourselves for the time being to the pictorial symbols shown in solid line, those in which the arrow points in the direct sense D illustrate the method of transmission of force between the pads and the carrier when the disc 1 is turning in the direct sense D, whereas those in which the arrow faces in the opposite sense to the direct sense D illustrate the method of transmitting force between the pads and the carrier when the disc 1 is turning in the opposite sense to the direct sense D, the significance of the sense of the arrows obviously being the same in the case of the pictorial symbols in broken line.

Bearing in mind, however, that the maximum speed of a vehicle travelling forwards is very much higher than the maximum speed of the same vehicle travelling backwards, the invention is essentially interested only in the methods of transmitting force for the direct sense of rotation D of the disc, that is to say when the vehicle is travelling forwards, the choice of methods for transmitting force when the vehicle is travelling backwards being less critical.

To sum up, FIG. 4 therefore shows:

that in a first possible embodiment of the invention, the inboard pad 51 needs to be caught via its upstream end 511 in the upstream inboard housing 211 without its downstream end 512 pressing against a stop of the downstream inboard housing 221, whereas the outboard pad 52 needs to press via its downstream end 522 against a stop 622 of the downstream outboard housing 222 without its upstream end 521 being caught on the upstream outboard housing 212;

that in a second possible embodiment of the invention, the outboard pad 52 needs to be caught via its upstream end 521 on the upstream outboard housing 212 without its downstream end 522 pressing against a stop of the downstream outboard housing 222, whereas the inboard pad 51 needs to press via its downstream end 512 against a stop of the downstream inboard housing 221 without its upstream end 511 being caught on the upstream inboard housing 211;

that in the first embodiment of the invention, it is furthermore possible to contrive for the outboard pad 52 to be caught via its end 522 on the outboard housing 222 when the vehicle is travelling backwards, without its end 521 pressing against a stop of the outboard housing 212, while the inboard pad 51 presses via its end 511 against a stop of the inboard housing 211 without its end 512 being caught on the inboard housing 221; and that in the second embodiment of the invention, it is also possible to contrive for the inboard pad 51 to be caught via its end 512 on the inboard housing 221, when the vehicle is travelling backwards, without its end 511 pressing against a stop of the inboard housing 211, while the outboard pad 52 presses via its end 521 against a stop of the outboard housing 212 without its end 522 being caught on the outboard housing 222.

Another essential aspect of the invention is that if K1 denotes the stiffness of the upstream branch 21 for a force applied to the upstream stop 611, and if K2 denotes the stiffness of the downstream branch 22 for a force applied to the downstream stop 622, then the ratio K1/K2 between these stiffnesses must be between 0.80 and 1.25, that is to say that the upstream and downstream branches must have at least similar stiffnesses, these stiffnesses preferably being as similar as possible to one another, and for example such that their ratio K1/K2 is rather between 0.95 and 1.05.

Thanks to these features, which give the inboard pad 51 mobility comparable with that of the outboard pad 52 as far as their common dragging by the disc 1 is concerned, and which therefore guarantee a simultaneous and equivalent movement of these pads under braking, the phenomenon described with reference to FIG. 2, and all of its negative consequences, can be avoided.

As FIGS. 5 and 6 show, the upstream and downstream branches 21, 22 are connected to the base 23 of the carrier by respective upstream and downstream bridges 241, 242.

A first of these bridges, in this case the upstream bridge 241 in the figures, serves to connect to the base 23 of the carrier that branch one housing of which forms a stop for the inboard pad 51, that is to say, in this case, the upstream branch 21 the housing 211 of which bears the stop 611.

The second of the upstream and downstream bridges, in this case the downstream bridge 242 in the figures, serves to connect to the base 23 of the carrier that branch one of the housings of which forms a stop for the outboard pad 52, that is to say, in this case, the downstream branch 22 the housing 222 of which bears the stop 622.

This being the case, as the outboard stop 622 is, by construction, further from the vehicle than the inboard stop 611, an advantageous way of satisfying the condition that the ratio K1/K2 has to satisfy, at least if the carrier is made out of just one material, consists in giving the first and second bridges cross-sections S1 and S2 which differ, and which are such that the cross-section S2 of the second bridge is greater than the cross-section S1 of the first bridge (see FIG. 3).

In the embodiment illustrated in FIGS. 3, 5 and 6, and in which the upstream bridge 241 has a lower end 241a adjoining the base 23 of the carrier and an upper end 241b distant from the base 23, the guide means 41 provided on the carrier, in this case the bore 41, is advantageously situated at the upper end 241b of the upstream bridge 241 so that the caliper can follow the movement of the inboard pad 51, without any lead or lag.

Another advantageous feature of the invention can be defined by considering (see FIG. 4) that the disc 1 delimits, for example via its mid-plane 13, two half-spaces E+, E−, each of which points towards a corresponding face 11, 12 of the disc.

This being the case, it is preferable for the first pin, that is to say that one of the first and second guide means which is a pin, to enter the first bore via an opening of the first bore which is in the same half-space as the upstream stop.

For example, in the embodiment of FIGS. 3, 5 and 6, which envisages for the first guide means 41, that is to say the guide means associated with the carrier 2, is a bore, and that the second guide means 42, that is to say the one associated with the caliper 3, is a pin, it is preferable for the pin 42 to enter the bore 41 via an opening 411 which is in the same half-space E− as the upstream stop 611.

Similarly, when the disc brake of the invention comprises, by way of additional guide means, a second bore 43 and a second pin 44 sliding in this second bore 43, it is preferable for this second pin 44 to enter the second bore 43 via an opening 431 therein which is in the same half-space E+ as the downstream stop 622.

Finally, as FIGS. 5 and 6 show, it is also advantageous to make provision for the upstream and downstream branches 21, 22 to be joined together only by the base 23 of the carrier, so as to make the carrier easier to design and avoiding any strong interaction between the movement of the upstream stop 611 and the movement of the downstream stop 622.

What is claim is:

1. A disc brake for a motor vehicle, comprising: a disc having an inboard face and an outboard face, said disc rotating about a transverse axis in a direct sense of rotation when the vehicle is travelling forward; a carrier comprising an upstream branch and a downstream branch straddling said disc and secured to a common base which is fixed to the vehicle facing said inboard face of said disc, said downstream branch extending from said upstream branch in said direct sense of rotation of the disc, said upstream and downstream branches each having an inboard housing and an outboard housing which are correspondingly situated one on each side of said disc; a caliper straddling said disc and mounted to slide relative to said carrier in a transverse direction parallel to said transverse axis, said caliper comprising a jaw pointing toward said outboard face of said disc and a cylinder closed by a piston and pointing toward said inboard face of said disc; first and second guide means respectively located on said carrier and said caliper, one of said first and second guide means consisting of a first bore while another of said first and second guide means consisting of a first pin which slides in said first bore; and first and second friction pads including an inboard pad and an outboard pad respectively located in the transverse direction between said piston and said inboard face of the disc and between said outboard face of said disc and said jaw of said caliper, said inboard pad having an upstream end and a downstream end mounted to respectively slide in said inboard housings of said upstream and downstream branches, and said outboard pad having an upstream end and a downstream end mounted to respectively slide in said respective outboard housings of said upstream and downstream branches, said inboard and outboard pads bearing, between their respective ends, respective first and second friction linings pointing towards said inboard and outboard faces of said disc and by means of which each pad is urged by said disc in the direct sense of rotation in the event of braking while the vehicle is travelling forwards, a first portion of the said inboard housing and a second portion of said outboard housing of said upstream and downstream branches respectively forming first and second stops for said ends of said first and second pads, said first and second stops opposing a movement of the inboard and outboard pads in the direct sense of rotation, said disc brake being characterized in that when said first and second pads are urged in the direct sense of rotation, only said first of said inboard and outboard housings of said upstream branch forms an upstream stop for said upstream end of only a first of said first and second inboard and outboard pads, while only said second of said inboard and outboard housings of said downstream branch forms a downstream stop for a downstream end of just a second one of said inboard and outboard pads, said upstream and downstream branches being respectively connected to a base of said carrier by upstream and downstream bridges which have different cross-sections, a first of said upstream and downstream bridges being connected to said base of said branch whose housing forms a stop for said inboard pad and a second of said upstream and downstream bridges being connected to said base of said branch whose housing forms a stop for said outboard pad, said first of said upstream bridges having a cross-section smaller than the cross-section of second of said upstream bridges, said upstream branch having a first stiffness for a force applied to said upstream stop and said downstream branch having a second stiffness for a force applied to said downstream stop, said first and second stiffness having a ratio (K1/K2) of between 0.80 and 1.25.

2. The disc brake according to claim 1, characterized in that said ratio (K1/K2) is between 0.95 and 1.05.

3. The disc brake according to claim 1, characterized in that said first housing is the inboard housing of said upstream branch and said second housing is the outboard housing of the downstream branch, and said upstream end of the inboard pad has a retaining profile via which said upstream end is caught on said upstream stop of said inboard housing of said upstream branch and said downstream end of said outboard pad bears against said downstream stop of said outboard housing of said downstream branch.

4. The disc brake according to claim 3, characterized in that said first housing is the inboard housing of said upstream branch and said second housing is the outboard housing of the downstream branch, and said upstream end of the inboard pad has a retaining profile via which said upstream end is caught on said upstream stop of said inboard housing of said upstream branch and said downstream end of said outboard pad bears against said downstream stop of said outboard housing of said downstream branch.

5. The disc brake according to claim 1, characterized in that said upstream bridge has a lower end adjoining said base of said carrier and an upper end distant from said base and said first guide means is located at said upper end of said upstream bridge.

6. The disc brake according to claim 1, characterized in that said disc delimits two half-spaces each of which points towards one of said inboard and outboard faces of said disc and said first pin enters said first bore via an opening of the first bore which lies in a half-space in which said upstream stop is situated.

7. The disc brake according to claim 1, characterized by a third and fourth guide means respectively provided on said carrier and caliper and one of said third and fourth guide means having a second bore while the other of said third and fourth guide means having a second pin which slides in said second bore, said second pin enters said second bore via an opening of the second bore which lies in a half-space in which said downstream stop is situated.

8. The disc brake according to claim 1, characterized in that said upstream and downstream branches are only joined together by said base of said carrier.

* * * * *